(12) United States Patent
Lu

(10) Patent No.: US 8,638,002 B2
(45) Date of Patent: Jan. 28, 2014

(54) KAMAN VORTEX STREET GENERATOR

(76) Inventor: Ming Lu, Tianjin (CN)

( * ) Notice: Subject to any disclaimer, the term of this patent is extended or adjusted under 35 U.S.C. 154(b) by 164 days.

(21) Appl. No.: 13/188,508

(22) Filed: Jul. 22, 2011

(65) Prior Publication Data

US 2011/0273032 A1    Nov. 10, 2011

Related U.S. Application Data

(63) Continuation of application No. PCT/CN2010/075622, filed on Jul. 31, 2010.

(30) Foreign Application Priority Data

Aug. 4, 2009 (CN) .......................... 2009 1 0070042
Aug. 4, 2009 (CN) ...................... 2009 2 0098214 U

(51) Int. Cl.
*F03G 7/00* (2006.01)
(52) U.S. Cl.
USPC ......................................................... 290/1 R
(58) Field of Classification Search
USPC .................................... 290/1 R, 54; 310/339
See application file for complete search history.

(56) References Cited

U.S. PATENT DOCUMENTS

| 5,223,763 | A  | * | 6/1993  | Chang .......................... 310/339 |
| 5,578,877 | A  | * | 11/1996 | Tiemann ........................ 310/15 |
| 7,199,480 | B2 | * | 4/2007  | Fripp et al. .................... 290/1 R |
| 7,224,077 | B2 | * | 5/2007  | Allen ............................. 290/1 R |
| 2008/0048455 | A1 | * | 2/2008  | Carney ............................ 290/54 |
| 2008/0277941 | A1 | * | 11/2008 | Bowles et al. .................. 290/54 |
| 2011/0049901 | A1 | * | 3/2011  | Tinnen et al. .................. 290/54 |

* cited by examiner

*Primary Examiner* — Tho D Ta

(57) ABSTRACT

A Karman vortex street generator including a shell (1), permanent magnets (3, 6), a vortex generating body (4), and a metal winding (5). Both ends of the shell (1) are respectively provided with an inlet end (2) and an outlet end (7). The permanent magnets (3, 6) are respectively located on two corresponding surfaces inside the shell (1), and the N pole of the permanent magnet on one surface corresponds to the S pole of the permanent magnet on the other surface so as to form a magnet field in the shell (1). The vortex generating body (4) is provided in the vertical center position near the inlet end (2) in the shell (1) so as to generate a Karman vortex when a fluid flows. The metal winding (5) located in the magnet field is able to regularly cut magnetic lines of force under the action of the Karman vortex and makes magnetic flux passing through the metal winding (5) change so as to generate an induction current.

9 Claims, 5 Drawing Sheets

KAMAN VORTEX STREET GENERATOR

CROSS-REFERENCE TO RELATED APPLICATIONS

This application is a continuation of International Patent Application No. PCT/CN2010/075622, with an international filing date of Jul. 31, 2010, designating the United States, now pending, and further claims priority benefits to Chinese Patent Application No. 200920098214.1 filed Aug. 4, 2009, and to Chinese Patent Application No. 200910070042.1 filed Aug. 4, 2009. The contents of all of the aforementioned applications, including any intervening amendments thereto, are incorporated herein by reference.

BACKGROUND OF THE INVENTION

1. Field of the Invention

This invention relates to electricity power generation, and particularly provides an electrical power generation device (generator) utilizing the oscillating action of the Karman vortex street to generate the induced alternate current. This device converts the energy from fluid motion to useable energy.

2. Description of the Related Art

Reynold's number, Re, a non-dimensional number which is defined as the ratio of fluid inertia to viscosity force, is often used to describe fluid flow. The Re for compressible fluid is defined as follows, $$Re = \frac{\rho V_\infty L}{\mu}, \quad (1)$$

where $\rho$, $V_\infty$, $\mu$ is respectively the density, velocity, and dynamic viscosity of the fluid, and L is the characteristic length. When fluid passes a non-streamlined body (or called body, or vortex generating body) in a given rang of Re, since the adverse pressure gradient exists in the boundary layer of the fluid on the body, the fluid starts to separate with the time developing. A lot of experimental and theoretical studies had shown that when Re is from 50 to 500, the vortices are continuously and periodically shed from each side of the body and the rotation direction of the paired vortices is alternate. Two stable, regularly spaced rows of vortices with laminar core are formed in the wake behind the body. This fluid motion pattern is called the Karman vortex street, named after the Germany fluid dynamist Theodore Von Karman (1881-1963), owning to his exploring research on this fluid motion. FIG. 1 presents the pattern of the Karman vortex street. The circulation conservation law can explain the formation of the Karman vortex street. It means that when a vortex produces, another vortex with apposite circulation surely exists. In practices, when flows pass the buildings, electrical lines, bridge piles, etc., the Karman vortex street will appear. Another non-dimensional parameter, Strouhal number, also describes the relation between the vortex shedding frequency and fluid velocity in the Karman vortex Street. The Strouhal number, St, is defined as $$St = \frac{fL}{V_\infty}, \quad (2)$$

where f is the vortex shedding frequency and the other variables are same as before. Under a range of Re, the Strouhal number is fixed, therefore, the fluid velocity can be found by measuring the vortex shedding frequency, which is the basic principle of the widely used Karman vortex flow meters.

The vortices in the Karman Vortex Street behind the vortex generating body are conducted to downstream. At the same time, because of the circulation around a vortex, a force along the lateral direction (perpendicular to the fluid direction) acts on the vortex. This force is called lift. In the Karman vortex street, fluid behaviors alternately force along the two rows of vortices. According to the principle of action and opposite action, the alternate shedding of vortices can create periodic lateral force on the body, which induces the body oscillation. In engineering practices, this oscillation could make the body fatigued and damaged. For example, the accident of Tcomn Narrow Bridge was caused by the Karman vortex street.

To convert this oscillating energy generated by the Karman Vortex Street to the usable energy, such as electrical power, is the purpose of this invention.

SUMMARY OF THE INVENTION

The present invention provides a device to convert energy of fluid flow to electricity power.

The present invention is a Karman vortex electricity generation device. It includes:

the shell, which is cylinder-like and with inlet end and outlet end;

the permanent magnates, with one S pole and one N pole, which are respectively located on the two corresponding surfaces inside the shell, forming magnet field;

the vortex generating body, which is mounted inside the shell, producing the Karman vortex street; and the metal winding, which is located in the magnet field to produce induced current.

The permanent magnates are respectively located on the two corresponding surfaces inside the shell. The height of the permanent magnates, h, follows the formula $$h = \frac{1}{2}(H - L) \sim \frac{1}{2}(H + L),$$

where H is the interior height of the shell, L is the characteristic length of the vortex generating body. The metal winding is arranged on the vortex generating body.

This invention provides an embodiment with an elastic material made vortex generating body, whose two ends is fixed on the two permanent magnates or inside surface of the shell. This invention also supplies another embodiment with a rigid vortex generating body, which is connected to the bottom and top of the shell by a flexible supporting. The vortex generating body is cylinder-like, hollowed and opened at the two ends. The metal winding is winded on the surface or inside of the vortex generating body. The third embodiment is that the metal winding can rotate around a shaft within the magnet field downstream of the vortex generating body in the shell. The distance between the vortex generating body and the permanent magnates is large or equal to 2L. For all embodiments above, the sectional shape of the vortex generating body can be circle, rectangular or others.

This invention also supplies an electrical power generation system, which includes at least two of the device mentioned above. This system combines the devices as the cell in circumstance of need of a large amount of electricity.

The benefits of this invention are follows. Firstly, it is a new way to convert the energy of fluid motion to electrical power;

secondly, the device is simple and compact, and does not have any more requirements to the environment settings. Moreover, compared to any other electricity generation device in fluid media with rotors, the shell protects from the attacks of birds and ruins of landscapes, so that it can run in urban area.

It is easy to design the sectional shape of the shell to combine several the devices together, such as, arranging several shells with the sectional shape of hexagon together to form honeycomb shape.

BRIEF DESCRIPTION OF THE DRAWINGS

Detailed description will be given below in conjunction with accompanying drawings.

Figure 1:
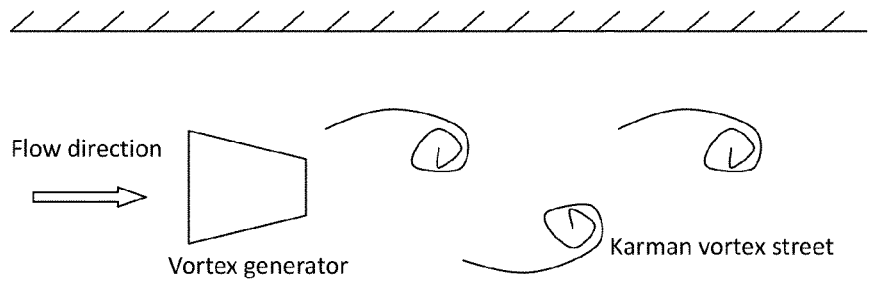
FIG. 1 is the diagrammatical view of formation of the Karman vortex street.

In the drawings, the following reference numbers are used: 1. shell, 2. inlet end, 3. permanent magnate N pole, 4. vortex generating body, 5. metal winding, 6. permanent magnate S pole, 7. outlet end, 8. flexible upper supporting, 9. flexible lower supporting, 10. rotating shaft, 11. small hole.

DETAILED DESCRIPTION OF THE EMBODIMENTS

The idea of this invention is that:

Based on the Faraday's law of electromagnetic phenomenon, which is that when the closed metal winding in the magnet field moves and cuts the magnetic lines of force to make the magnetic flux through the metal winding change, the induced current will be produced in the metal winding. Referring to the background technology, the metal winding can be winded on the vortex generating body, behind which the Karman vortex street will produce the periodic and alternate force. This force acts on the body to cause the metal winding in the magnet field oscillating. If the magnetic flux through the metal winding changing, the alternate current is induced.

As shown from FIG. 2 to FIG. 11, this invention presents a Karman vortex street generator. It includes:

the shell 1 with the inlet end 2 and outlet end 7;

the permanent magnate N pole 3 and the permanent magnate S pole 6, which are located on the two corresponding surfaces of the shell 1, forming the magnet field in the shell 1;

the vortex generating body 4, which is provided in the vertical center position near the inlet end 2 in the shell 1; and the metal winding 5, who is winded on the vortex generating body 4 and in the magnet field, and whose two ends go out the shell 1 from the small hole 11.

The detailed descriptions according the figures are followed.

Figure 2:
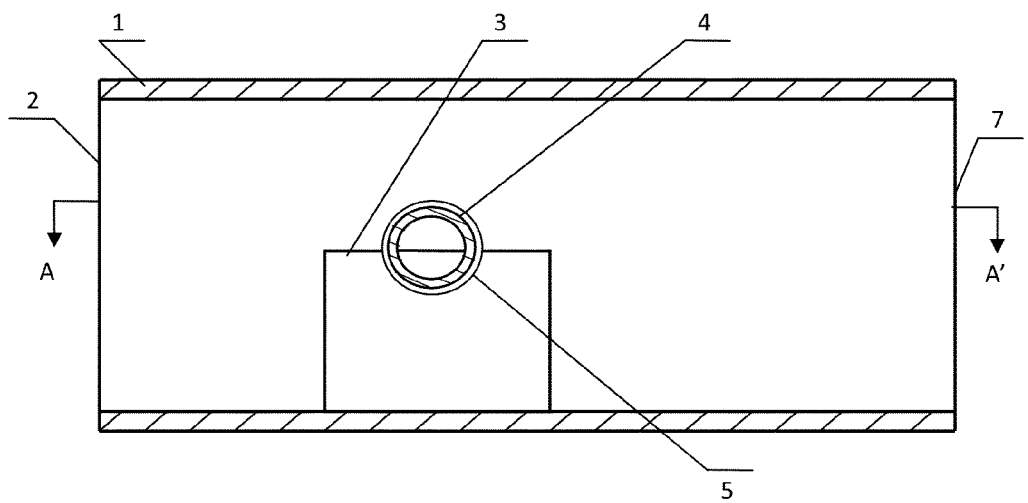
FIG. 2 is the longitude sectional view of the first embodiment of the Karman vortex generator.
Figure 3:
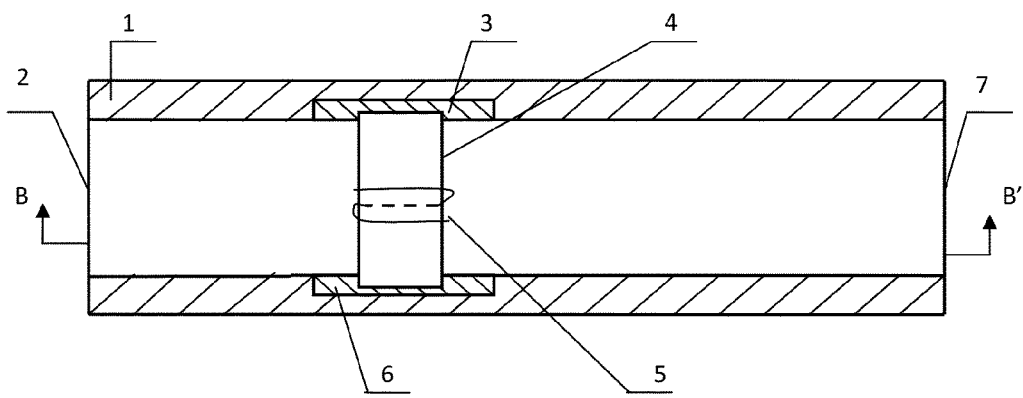
FIG. 3 is the A-A' sectional view of FIG. 2.
Figure 4:
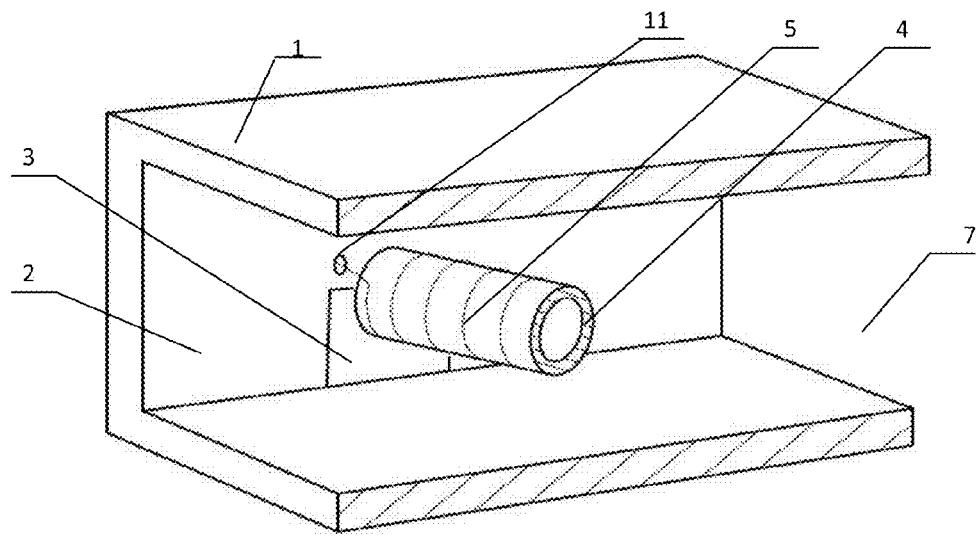
FIG. 4 is the perspective view of FIG. 2.

FIG. 2 is the longitude sectional view of the first embodiment of the Karman vortex generator. It is also the B-B' sectional view of FIG. 3. FIG. 3 is the A-A' sectional view of FIG. 2. FIG. 4 is the perspective view of FIG. 2. This device includes the shell 1 with the inlet end 2 and outlet end 7. The sectional shape of the shell is rectangular. The permanent magnate N pole 3 and the permanent magnate S pole 6 are located on the two corresponding surfaces of the shell 1 and form the magnet field in the shell 1. The height of the permanent magnates h is equal to the half height of the interior height of the shell. The vortex generating body 4, which is made of elastic material, is mounted on the two permanent magnates or on the surface of the shell near of the inlet end 2. The Karman vortex can make the vortex generating body produce the lateral deformation. The metal winding 5, whose two ends go out of the shell from the small hole 11, is winded on the surface of the vortex generating body and is located in the magnet field. The surface of the vortex generating body 4 with the metal winding should be smooth to protect the fluid passing.

Figure 5:
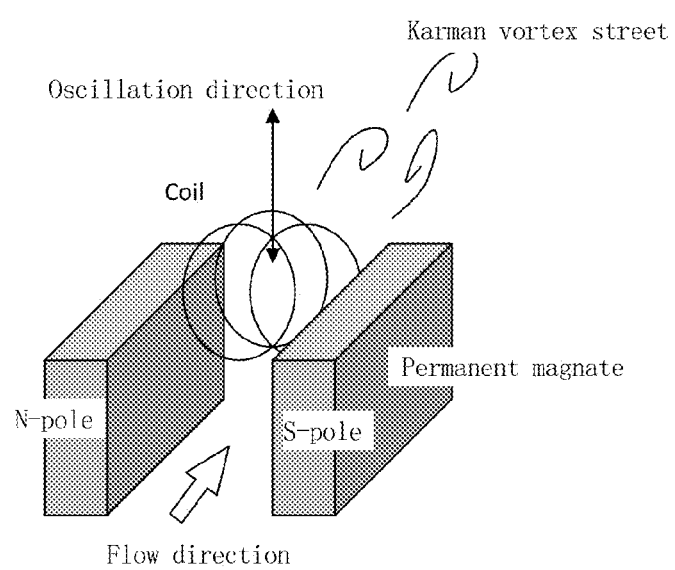
FIG. 5 is the diagrammatical view of the first practical scheme of the Karman vortex generator.

As shown in FIG. 5, when the device is put in fluid media, such as in wind field or in a movable transportation, the fluid comes into the shell and the Karman vortex street forms behind the vortex generating body, which alternately make the elastic body's displacement in lateral direction. This displacement makes the metal winding on the vortex generating body cut the magnetic lines of force that are formed between the two permanent magnates mounted on the two corresponding surfaces of the shell. The period and alternate movement of the metal winding changes the magnetic flux, then the induced current produced. The elastic vortex generating body, made of rubber, etc., with the rectangular, trapezoid, diamond, or other non-streamlined sectional shape, is mounted more than 2L away from the inlet end. The distance can conduct the inflow. L is the characteristic length of the vortex generating body, which is the length of the sectional shape along the flow direction. If the sectional shape is circular, the characteristic length is the diameter of the circular. If the shape is trapezoid, it is the length of the bottom of the trapezoid. If the shape is rectangular, it is the length of the side perpendicular to the flow direction. The height of the permanent magnates, h, follows the formula $$h = \frac{1}{2}(H-L) \sim \frac{1}{2}(H+L),$$

where H is the interior height of the shell. The vortex generating body, which is cylinder-like, opened, thin walled, and hollowed. The metal winding is winded on the external or internal surface of the vortex generating body.

Prerequisite of the device's application is the fluid motion and the Re is within the range of the Karman vortex street generation. General practical wind situations follow this condition. For example, if the wind speed is 0.02 meter per second, the density and dynamic viscosity of air is 1.2 kg per cubic meter and $1.8 \times 10^{-5}$ Pa·second, and the characteristic length of vortex generating body is 0.1 meter, according to the equation (1), Re is 133. The force acting on the vortex generating body is direct proportion to the velocity and the characteristic length. According to the kinemics analysis, ignoring the weight of the body, the lift $F_L$ is equal to the restoring force of elastic material $F_s$, then $$F_L = F_S. \tag{3}$$

Based on the Hooke's law, the force on the vortex generating body can be expressed as $$F_S = k \cdot dY, \tag{4}$$

where k is the linear elastic constant, dY is the body's displacement. From equations (3) and (4), dY becomes $$dY = \frac{F_L}{k}. \quad (5)$$

dY can be obtained by choosing the different sectional shape of the vortex generating body and the linear elastic constant. The dynamic analysis will give the function of the displacement with time. It is $$Y(t) = A_o \sin(2\pi f_e t), \quad (6)$$

where $A_o$ is the oscillation amplitude of the body, $f_e$ is the oscillation frequency of body and equal or close to the vortex shedding frequency.

Figure 6:
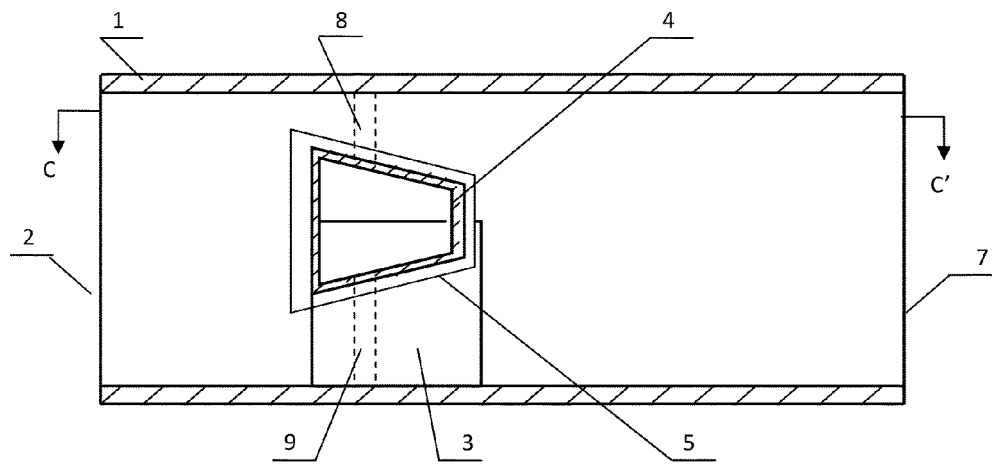
FIG. 6 is the longitude sectional view of the second practical scheme of the Karman vortex generator.
Figure 7:
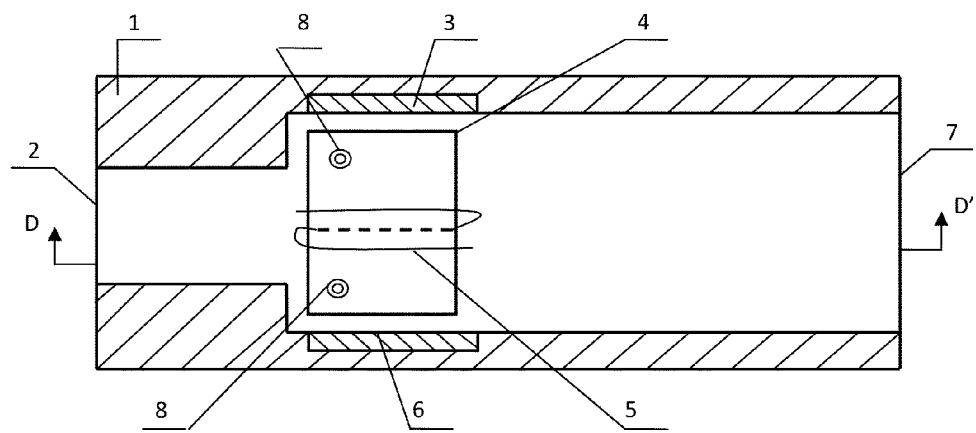
FIG. 7 is the C-C' sectional view of FIG. 6.
Figure 8:
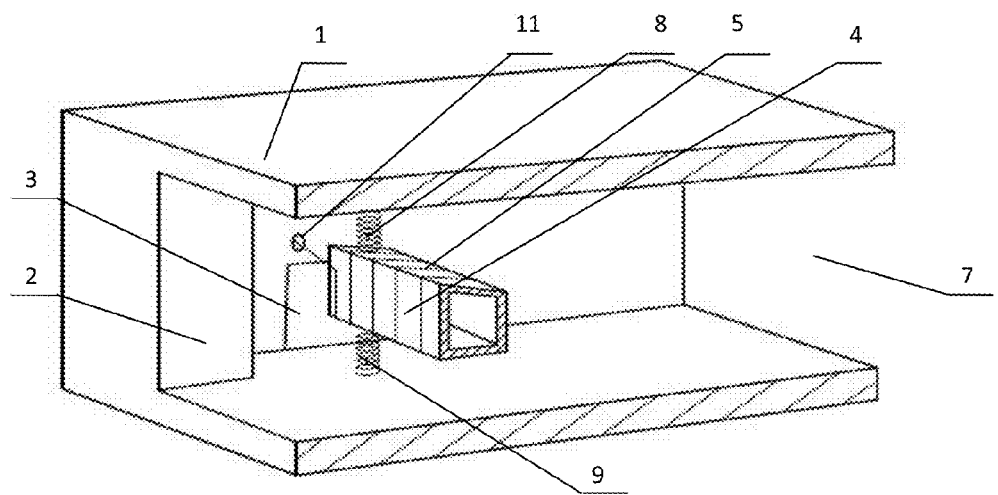
FIG. 8 is the perspective view of FIG. 6.

FIGS. 6 and 7 present the sectional view of second embodiment of the Karman vortex generator. FIG. 6 is the D-D' sectional view of FIG. 7. FIG. 8 is the perspective view of FIG. 6. The difference of this embodiment to the last one is that the vortex generating body is rigid body and connected with the shell 1 by the flexile supporting made of springs. In this example, the rigid vortex generating body 4 with trapezoid sectional shape is connected and mounted in the shell 1 using the upper flexible supporting 8 and the lower flexible supporting 9. To avoid the flexible supporting' disturbing to the flow motion, the sectional area of the inlet end 2 is decreased. Besides springs, the flexible supporting can be made of other elastic materials, such as elastic ribbon. The rigid vortex generating body can be solid or hollowed, cylinder-like, opened at the two ends, and made of non-metal materials. The metal winding 5 can be winded on the exterior or interior surface of the vortex generating body 4.

This device is put in the fluid flows. The fluid comes into the shell 1 through inlet end 2. The Karman vortex street makes the vortex generating body 4 bringing the metal winding 5 oscillating in lateral direction, which change the magnetic flux though the metal winding and produce the induced current. The ends of the metal winding go out the shell 1 from a small hole 11.

Figure 9:
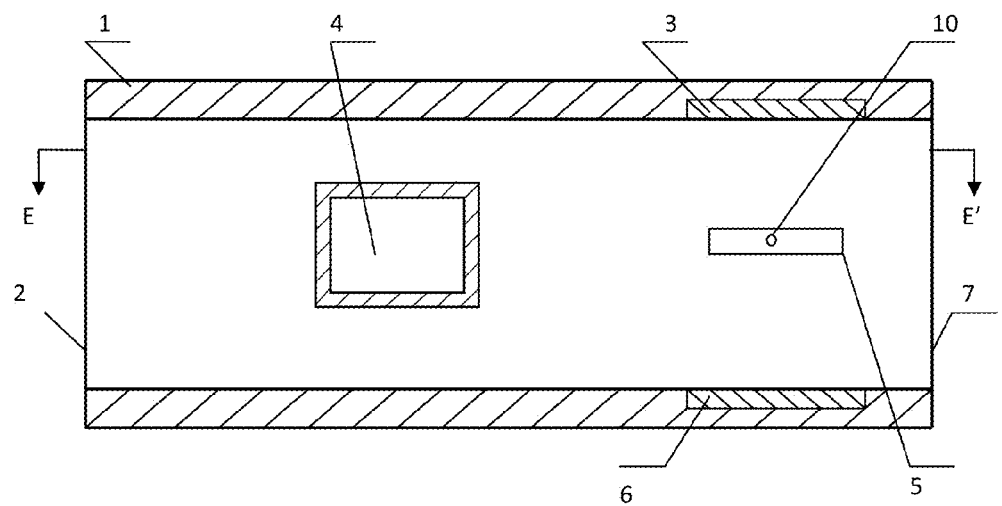
FIG. 9 is the longitude sectional view of the third practical scheme of the Karman vortex generator.
Figure 10:
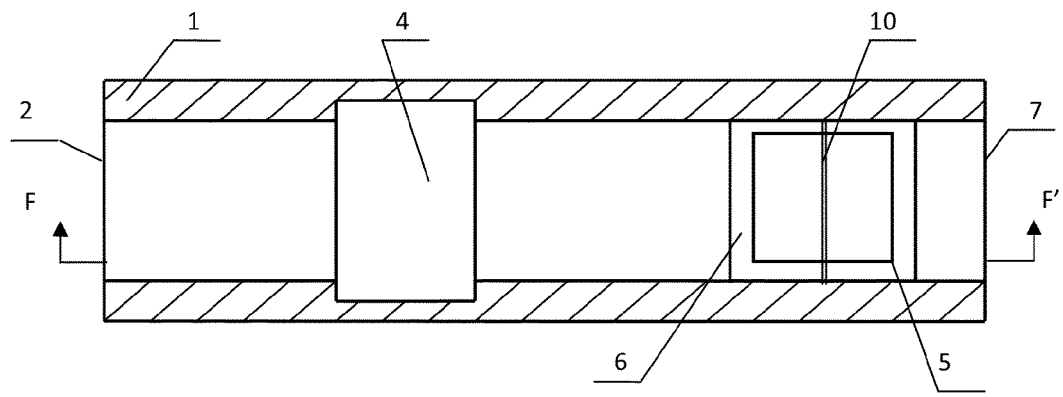
FIG. 10 is the E-E' sectional view of FIG. 9.
Figure 11:
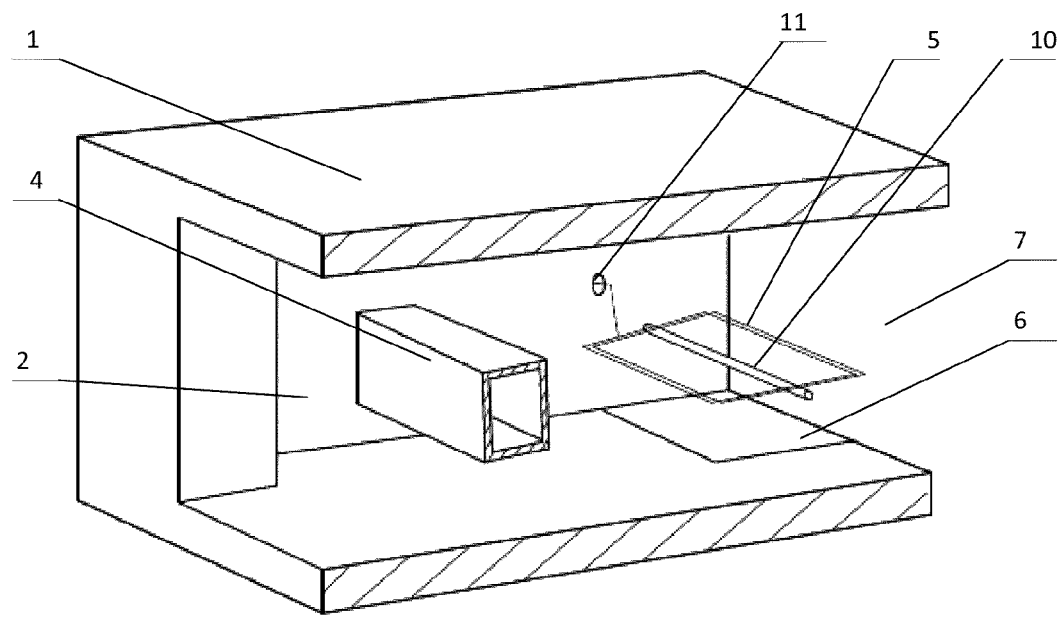
FIG. 11 is the perspective view of FIG. 9.

FIGS. 9 and 10 present the sectional view of the third embodiment of the Karman vortex street generator. FIG. 9 is the F-F' sectional view of FIG. 10. FIG. 11 is the perspective view of FIG. 9.

The vortex generating body 4 with rectangular sectional shape is mounted inside of the shell 1. The permanent magnate N pole 3 and the permanent magnate S pole 6 are mounted on top and bottom of the shell 1, between which the magnet field formed and the rotating metal winding 5 is mounted on the shaft 10 fixed on the two side of the shell 1. The distance between the vortex generating body 4 and the permanent magnate N pole 3 and the permanent magnate S pole 6 along the flow direction at the inlet end 2 is large or equal 2L, which makes the metal winding 5 is in the domain of the Karman vortex street.

This device is put in the fluid flows, such as wind field. The fluid comes into the shell 1 through the inlet end 2. The Karman vortex street makes the metal winding 5 plunging in the magnetic field formed by the permanent magnate N pole 3 and the permanent magnate S pole 6, which changes the magnetic flux though the metal winding 5 and produce the induced current. The ends of the metal winding go out the shell 1 from a small hole 11.

In a circumstance of need of large electricity, several present devices can be combined together to use. A preferred choice is to adopt the hexagon as the sectional shape of the shell to form a system with honeycomb-like sectional shape.

In all the preferred embodiments, the install direction of the device can be adjusted to be oriental to the flow direction. When the flow direction is horizontal, the device is installed horizontally. The device also can be rotated 0°-90° along the axis of flow direction For example, if the device rotates 90°, the weight of vortex generating body and metal winding does not affect the oscillation of the vortex generating body and metal winding.

The present invention is not limited to the above examples and can be extended to other designs. Any device using the Karman vortex street to make metal winding oscillating or plunging produce induced current should be protected by this patent.

The invention claimed is:
1. A Karman vortex street generator, comprising:
   a shell with two opened ends, inlet end and outlet end;
   permanent magnates, whose N pole and S pole are located on the corresponding surfaces of said shell, forming a magnet field;
   a vortex generating body mounted inside said shell for producing a Karman vortex street in response to fluid flow across the vortex generating body; and
   a metal winding located in the magnet field for cutting the magnetic lines of force that are formed between the permanent magnates under the action of the Karman vortex street to produce induced current;
   wherein said vortex generating body being without cantilever arms extending therefrom;
   wherein the permanent magnates, whose height, h, follows the formula
   h=½(H−L) to ½(H+L), where H is an interior height of the shell, L is a characteristic length of the vortex generating body;
   wherein the two corresponding surfaces of said shell are behind said vortex generating body, between which the magnet field is formed and the metal winding having a rotating function around a shaft is located;
   wherein the distance between the vortex generating body and the permanent magnates along a flow direction at the inlet end is larger than or equal to 2L.
2. The Karman vortex street of claim 1, wherein the shell has a circular or polygon sectional shape.
3. The Karman vortex street generator system includes at least two Karman vortex street generator of claim 1.
4. The Karman vortex street generator of claim 1, wherein the vortex generating body is made of elastic materials and two ends of which are mounted on the shell.
5. The Karman vortex street generator of claim 4, wherein the vortex generating body is hollowed and thin-shelled body.
6. The Karman vortex street generator of claim 1, wherein the vortex generating body is rigid body, which is connected with the shell by the flexible upper and lower supporting.
7. The Karman vortex street generator of claim 6, wherein the Vortex generating body is hollowed, and thin-shelled body.
8. The Karman vortex street generator of claim 6, wherein the flexible upper and lower supporting compose of springs.
9. The Karman vortex street generator of claim 8, wherein the Vortex generating body is hollowed, and thin-shelled body.

* * * * *